(12) United States Patent  
Azancot et al.

(10) Patent No.: US 8,427,012 B2  
(45) Date of Patent: Apr. 23, 2013

(54) NON RESONANT INDUCTIVE POWER TRANSMISSION SYSTEM AND METHOD

(75) Inventors: Yossi Azancot, Jerusalem (IL); Amir Ben-Shalom, Modiin (IL); Oola Greenwald, Mevasseret Zion (IL); Arik Rofe, Jerusalem (IL); Alfred Lei-Bovitz, Petach Tikva (IL); Moti Ashery, Jerusalem (IL)

(73) Assignee: Powermat Technologies, Ltd., Neve Ilan (IL)

( * ) Notice: Subject to any disclaimer, the term of this patent is extended or adjusted under 35 U.S.C. 154(b) by 0 days.

(21) Appl. No.: 13/458,164

(22) Filed: Apr. 27, 2012

(65) Prior Publication Data

US 2012/0212073 A1  Aug. 23, 2012

Related U.S. Application Data

(63) Continuation of application No. 12/497,088, filed on Jul. 2, 2009, now Pat. No. 8,188,619.

(60) Provisional application No. 61/129,526, filed on Jul. 2, 2008, provisional application No. 61/129,859, filed on Jul. 24, 2008.

(51) Int. Cl.  
*H01F 27/42* (2006.01)  
*H01F 38/00* (2006.01)

(52) U.S. Cl.  
USPC ........................................................ 307/104

(58) Field of Classification Search .................. 307/104  
See application file for complete search history.

(56) References Cited

U.S. PATENT DOCUMENTS

| | | |
|---|---|---|
| 723,836 A | 3/1903 | Cowing |
| 2,415,688 A | 2/1947 | Hall |
| 3,771,085 A | 11/1973 | Hojo et al. |
| 3,938,018 A | 2/1976 | Dahl |
| 4,160,193 A | 7/1979 | Richmond |
| 4,431,948 A | 2/1984 | Elder et al. |
| 4,754,180 A | 6/1988 | Kiedrowski |
| 4,977,515 A | 12/1990 | Rudden et al. |
| 5,221,877 A | 6/1993 | Falk |
| 5,278,771 A | 1/1994 | Nyenya |
| 5,367,242 A | 11/1994 | Hulman |
| 5,455,466 A | 10/1995 | Parks et al. |

(Continued)

FOREIGN PATENT DOCUMENTS

| | | |
|---|---|---|
| EP | 0160990 A2 | 11/1985 |
| EP | 0357839 A1 | 3/1990 |

(Continued)

OTHER PUBLICATIONS

Liu et al. "An Analysis of a Double-layer Electromagnetic Shield for a Universal Contactless Battery Charging Platform", IEEE 2005,p. 1767-1772.

(Continued)

*Primary Examiner* — Rexford Barnie  
*Assistant Examiner* — Dru Parries  
(74) *Attorney, Agent, or Firm* — Brooks Kushman P.C.

(57) ABSTRACT

Non-resonant inductive power transmission wherein the driving voltage across a primary inductor oscillates at a frequency significantly different from the resonant frequency of the inductive coupling system. Embodiments of the invention include systems and methods for: power regulation using frequency control, fault detection using voltage peak detectors and inductive communication channels.

30 Claims, 8 Drawing Sheets

U.S. PATENT DOCUMENTS

| | | |
|---|---|---|
| 5,486,394 A | 1/1996 | Stough |
| 5,528,113 A | 6/1996 | Boys et al. |
| 5,550,452 A | 8/1996 | Shirai et al. |
| 5,600,225 A | 2/1997 | Goto |
| 5,680,035 A | 10/1997 | Haim et al. |
| 5,713,939 A | 2/1998 | Nedungadi et al. |
| 5,734,254 A | 3/1998 | Stephens |
| 5,762,250 A | 6/1998 | Carlton et al. |
| 5,821,728 A | 10/1998 | Schwind |
| 5,821,731 A | 10/1998 | Kuki et al. |
| 5,907,285 A | 5/1999 | Toms et al. |
| 5,929,598 A | 7/1999 | Nakama et al. |
| 5,949,214 A | 9/1999 | Broussard et al. |
| 6,042,005 A | 3/2000 | Basile et al. |
| 6,127,799 A | 10/2000 | Krishnan |
| 6,211,649 B1 | 4/2001 | Matsuda |
| 6,230,029 B1 | 5/2001 | Hahn et al. |
| 6,396,935 B1 | 5/2002 | Makkonen |
| 6,436,299 B1 | 8/2002 | Barrman et al. |
| 6,441,589 B1 | 8/2002 | Frerking et al. |
| 6,484,260 B1 | 11/2002 | Scott et al. |
| 6,532,298 B1 | 3/2003 | Cambier et al. |
| 6,586,909 B1 | 7/2003 | Trepka |
| 6,624,616 B1 | 9/2003 | Frerking et al. |
| 6,644,557 B1 | 11/2003 | Jacobs |
| 6,673,250 B2 | 1/2004 | Kuennen et al. |
| 6,721,540 B1 | 4/2004 | Kayakawa |
| 6,731,071 B2 | 5/2004 | Baarman |
| 6,766,040 B1 | 7/2004 | Catalano et al. |
| 6,803,744 B1 | 10/2004 | Sabo |
| 6,825,620 B2 | 11/2004 | Kuennen et al. |
| 6,888,438 B2 | 5/2005 | Hui et al. |
| 6,894,457 B2 | 5/2005 | Germagian et al. |
| 7,019,620 B2 | 3/2006 | Bohler et al. |
| D519,275 S | 4/2006 | Shertzer |
| 7,043,060 B2 | 5/2006 | Quintana |
| 7,126,450 B2 | 10/2006 | Baarman et al. |
| 7,132,918 B2 | 11/2006 | Baarman et al. |
| 7,164,255 B2 | 1/2007 | Hui |
| 7,180,248 B2 | 2/2007 | Kuennen et al. |
| 7,180,265 B2 | 2/2007 | Naskali et al. |
| 7,210,940 B2 | 5/2007 | Baily et al. |
| 7,212,414 B2 | 5/2007 | Baarman |
| 7,224,086 B2 | 5/2007 | Germagian et al. |
| 7,233,319 B2 | 6/2007 | Johnson et al. |
| 7,262,700 B2 | 8/2007 | Hsu |
| D553,852 S | 10/2007 | Brandenburg |
| 7,385,357 B2 | 6/2008 | Kuennen et al. |
| 7,392,068 B2 | 6/2008 | Dayan et al. |
| 7,405,535 B2 | 7/2008 | Frerking et al. |
| 7,462,951 B1 | 12/2008 | Baarman |
| D586,809 S | 2/2009 | Jones et al. |
| 7,518,267 B2 | 4/2009 | Baarman |
| 7,522,878 B2 | 4/2009 | Baarman |
| 7,576,514 B2 | 8/2009 | Hui |
| D599,735 S | 9/2009 | Amidei et al. |
| D599,736 S | 9/2009 | Ferber et al. |
| D599,737 S | 9/2009 | Amidei et al. |
| D599,738 S | 9/2009 | Amidei et al. |
| D603,603 S | 11/2009 | Laine et al. |
| 7,612,528 B2 | 11/2009 | Baarman et al. |
| D607,879 S | 1/2010 | Ferber et al. |
| D611,407 S | 3/2010 | Webb |
| D611,408 S | 3/2010 | Ferber et al. |
| 2002/0057584 A1 | 5/2002 | Brockmann |
| 2002/0154518 A1 | 10/2002 | Elferich et al. |
| 2002/0158512 A1 | 10/2002 | Mizutani et al. |
| 2003/0210106 A1 | 11/2003 | Cheng et al. |
| 2004/0023633 A1 | 2/2004 | Gordon |
| 2004/0195767 A1 | 10/2004 | Randall |
| 2004/0203537 A1 | 10/2004 | Yoshida et al. |
| 2004/0242264 A1 | 12/2004 | Cho |
| 2004/0261802 A1 | 12/2004 | Griffin et al. |
| 2005/0007067 A1 | 1/2005 | Baarman et al. |
| 2005/0083020 A1 | 4/2005 | Baarman |
| 2005/0130593 A1 | 6/2005 | Michalak |
| 2005/0164636 A1 | 7/2005 | Palermo et al. |
| 2005/0169506 A1 | 8/2005 | Fenrich et al. |
| 2005/0192062 A1 | 9/2005 | Mickle et al. |
| 2005/0233768 A1 | 10/2005 | Guo et al. |
| 2006/0028176 A1 | 2/2006 | Tang et al. |
| 2006/0043927 A1 | 3/2006 | Beart et al. |
| 2006/0052144 A1 | 3/2006 | Seil et al. |
| 2006/0061325 A1 | 3/2006 | Tang et al. |
| 2006/0071632 A1 | 4/2006 | Ghabra et al. |
| 2006/0091222 A1 | 5/2006 | Leung et al. |
| 2006/0093132 A1 | 5/2006 | Desormiere et al. |
| 2006/0202665 A1 | 9/2006 | Hsu |
| 2007/0023559 A1 | 2/2007 | Scapillato et al. |
| 2007/0057763 A1 | 3/2007 | Blattner et al. |
| 2007/0076459 A1 | 4/2007 | Limpkin |
| 2007/0136593 A1 | 6/2007 | Plavcan et al. |
| 2007/0165371 A1 | 7/2007 | Brandenburg |
| 2007/0182367 A1 | 8/2007 | Partovi |
| 2007/0202931 A1 | 8/2007 | Lee et al. |
| 2007/0210889 A1 | 9/2007 | Baarman et al. |
| 2007/0279002 A1 | 12/2007 | Partovi |
| 2008/0001922 A1 | 1/2008 | Johnson et al. |
| 2008/0030985 A1 | 2/2008 | Jeon et al. |
| 2008/0049988 A1 | 2/2008 | Basile et al. |
| 2008/0055047 A1 | 3/2008 | Osada et al. |
| 2008/0079388 A1 | 4/2008 | Sarnowsky et al. |
| 2008/0132293 A1 | 6/2008 | Gundlach et al. |
| 2008/0157715 A1 | 7/2008 | Rosenboom et al. |
| 2008/0223926 A1 | 9/2008 | Miller et al. |
| 2008/0258680 A1 | 10/2008 | Frerking et al. |
| 2008/0265835 A1 | 10/2008 | Reed et al. |
| 2009/0026959 A1 | 1/2009 | Lin et al. |
| 2009/0040807 A1 | 2/2009 | Doumae et al. |
| 2009/0047768 A1 | 2/2009 | Jain |
| 2009/0047769 A1 | 2/2009 | Bhat et al. |
| 2009/0075704 A1 | 3/2009 | Wang |
| 2009/0079387 A1 | 3/2009 | Jin et al. |
| 2009/0084705 A1 | 4/2009 | Justiss |
| 2009/0097221 A1 | 4/2009 | Sayed et al. |
| 2009/0102416 A1 | 4/2009 | Burley |
| 2009/0134972 A1 | 5/2009 | Wu, Jr. et al. |
| 2009/0146608 A1 | 6/2009 | Lee |
| 2009/0153098 A1 | 6/2009 | Toya et al. |
| 2009/0153297 A1 | 6/2009 | Gardner |
| 2009/0174263 A1 | 7/2009 | Baarman et al. |
| 2009/0203355 A1 | 8/2009 | Clark |
| 2009/0212639 A1 | 8/2009 | Johnson |
| 2009/0226050 A1 | 9/2009 | Hughes |
| 2009/0243791 A1 | 10/2009 | Partin et al. |
| 2009/0251102 A1 | 10/2009 | Hui |
| 2009/0273891 A1 | 11/2009 | Peiker |
| 2009/0278494 A1 | 11/2009 | Randall |
| 2010/0039066 A1 | 2/2010 | Yuan et al. |
| 2010/0164458 A1 | 7/2010 | Pollard |

FOREIGN PATENT DOCUMENTS

| | | |
|---|---|---|
| EP | 0160990 B1 | 1/1991 |
| EP | 0558316 A1 | 9/1993 |
| EP | 0845695 A2 | 6/1998 |
| EP | 1990734 A1 | 11/2008 |
| FR | 2695285 A3 | 3/1994 |
| FR | 2739929 A1 | 4/1997 |
| GB | 778072 | 7/1957 |
| GB | 2399466 A | 9/2001 |
| GB | 2399466 B | 11/2005 |
| GB | 2429372 A | 2/2007 |
| JP | 2005327845 A | 11/2005 |
| WO | 9602879 A1 | 2/1996 |
| WO | 0201557 A1 | 1/2002 |
| WO | 0215320 A1 | 2/2002 |
| WO | 2005043775 A1 | 5/2005 |
| WO | 2006015143 A2 | 2/2006 |
| WO | 2008030985 A2 | 3/2008 |
| WO | 2008086080 A2 | 7/2008 |
| WO | 2008093334 A2 | 8/2008 |
| WO | 2008114268 A2 | 9/2008 |
| WO | 2009040807 A2 | 4/2009 |
| WO | 2009047768 A2 | 4/2009 |
| WO | 2009047769 A2 | 4/2009 |
| WO | 2009049657 A1 | 4/2009 |

| WO | 2009108958 A1 | 9/2009 |
| WO | 2010025156 A1 | 3/2010 |
| WO | 2010025157 A1 | 3/2010 |

OTHER PUBLICATIONS

Hui et al. "A New Generation of Universal Contactless Battery Charging Platform for Portable Consumer Electronic Equipment", IEEE Transactions on Power Electronics May 2005, vol. 20, No. 3, p. 620-627.

Liu et al. "Equivalent Circuit Modeling of a Multilayer Planar Winding Array Structure for Use in a Universal Contactless Battery Charging Platform", IEEE Transactions on Power Electronics Jan. 2007, vol. 22, No. 1, p. 21-29.

Tang et al. "Evaluation of the Shielding Effects on Printed-Circuit-Board Transformers Using Ferrite Plates and Copper Sheets", IEEE Transactions on Power Electronics Nov. 2002, vol. 17, No. 6, p. 1080-1088.

Su et al. "Extended Theory on the Inductance Calculation of Planar Spiral Windings Including the Effect of Double-layer Electromagnetic Shield", IEEE 2007, p. 3022-3028.

Liu et al. "Optimal Design of a Hybrid Winding Structure for Planar Contactless Battery Charging Platform", IEEE Transactions on Power Electronics Jan. 2008, vol. 23, No. 1, p. 455-463.

Liu et al. "Simulation Study and Experimental Verification of a Universal Contactless Battery Charging Platform With Localized Charging Features", IEEE Transactions on Power Electronics Nov. 2007, vol. 22, No. 6, p. 2202-2210.

International Search Report for PCT/IL2009/000915, Completed by the European Patent Office on Mar. 15, 2010, 3 Pages.

International Search Report and Written Opinion for PCT/IL2008/001282, Both completed by the US Patent Office on Feb. 25, 2009, All together 9 Pages.

International Search Report and Written Opinion for PCT/IL2008/001347, Both completed by the US Patent Office on Feb. 2, 2009, All together 10 Pages.

International Search Report and Written Opinion for PCT/IL2008/001348, Both completed by the US Patent Office on Jan. 28, 2009, All together 9 Pages.

International Search Report for PCT/IL08/01641, Completed by the US Patent Office on May 21, 2009, 3 Pages.

International Search Report for PCT/IL2008/000124, Completed by the European Patent Office on Nov. 3, 2008, 5 Pages.

International Search Report for PCT/IL09/00544, Completed by the US Patent Office on Sep. 16, 2009, 1 Page.

International Search Report for PCT/IL2009/000681, Completed by the European Patent Office on Sep. 16, 2009, 3 Pages.

Hatanaka et al. "Power Transmission of a Desk With a Cord-Free Power Supply", IEEE Transactions on Magnetics Sep. 2002, vol. 38, No. 5, p. 3329-3331.

NON RESONANT INDUCTIVE POWER TRANSMISSION SYSTEM AND METHOD

CROSS-REFERENCE TO RELATED APPLICATIONS

This application is a continuation of U.S. application Ser. No. 12/497,088 filed Jul. 2, 2009, now U.S. Pat. No. 8,188,619, issued May 29, 2012, which, in turn, claims the benefit of U.S. provisional Application No. 61/129,526, filed Jul. 2, 2008 and U.S. Provisional Patent Application Ser. No. 61/129,859, filed Jul. 24, 2008, the disclosures of which are hereby incorporated by reference in their entirety.

TECHNICAL FIELD

The present invention is directed to providing a communications channel for the transfer of feedback signals in inductive power transfer systems. More specifically, the present invention relates to coil-to-coil signal transfer in inductive power couplings.

BACKGROUND

Inductive power coupling allows energy to be transferred from a power supply to an electric load without a wired connection therebetween. An oscillating electric potential is applied across a primary inductor. This sets up an oscillating magnetic field in the vicinity of the primary inductor. The oscillating magnetic field may induce a secondary oscillating electrical potential in a secondary inductor placed close to the primary inductor. In this way, electrical energy may be transmitted from the primary inductor to the secondary inductor by electromagnetic induction without a conductive connection between the inductors.

When electrical energy is transferred from a primary inductor to a secondary inductor, the inductors are said to be inductively coupled. An electric load wired in series with such a secondary inductor may draw energy from the power source wired to the primary inductor when the secondary inductor is inductively coupled thereto.

The strength of the induced voltage in the secondary inductor varies according to the oscillating frequency of the electrical potential provided to the primary inductor. The induced voltage is strongest when the oscillating frequency equals the resonant frequency of the system. The resonant frequency $f_R$ depends upon the inductance L and the capacitance C of the system according to the equation $$f_R = \frac{1}{2\pi\sqrt{LC}}.$$

Known inductive power transfer systems typically transmit power at the resonant frequency of the inductive couple. This can be difficult to maintain as the resonant frequency of the system may fluctuate during power transmission, for example in response to changing environmental conditions or variations in alignment between primary and secondary coils.

Inductive transfer systems designed to transmit at resonance therefore require tuning mechanisms for maintaining transmission at the resonant frequency of the system. Tuning may be achieved by adjusting the driving frequency to seek resonance. For example, U.S. Pat. No. 6,825,620, titled "Inductively coupled ballast circuit" to Kuennen et al. describes a resonance seeking ballast circuit for inductively providing power to a load. The ballast circuit includes an oscillator, a driver, a switching circuit, a resonant tank circuit and a current sensing circuit. The current sensing circuit provides a current feedback signal to the oscillator that is representative of the current in the resonant tank circuit. The current feedback signal drives the frequency of the ballast circuit causing the ballast circuit to seek resonance. The ballast circuit includes a current limit circuit that is inductively coupled to the resonant tank circuit. The current limit circuit disables the ballast circuit when the current in the ballast circuit exceeds a predetermined threshold or falls outside a predetermined range.

Alternatively, tuning may be achieved by adjusting the characteristics of the inductive system. For example, U.S. Pat. No. 2,212,414, titled "Adaptive inductive power supply" to Baarman describes a contactless power supply which has a dynamically configurable tank circuit powered by an inverter. The contactless power supply is inductively coupled to one or more loads. The inverter is connected to a DC power source. When loads are added or removed from the system, the contactless power supply is capable of modifying the resonant frequency of the tank circuit, the inverter frequency, the inverter duty cycle or the rail voltage of the DC power source.

Tuning mechanisms such as those described above are necessary in order to maintain transmission at resonance because resonant transmission is highly sensitive. At resonance small variations to the system result in large changes to the power transferred. A further problem associated with resonant transmission is the high transmission voltages involved. At high operating voltages, the capacitors and transistors in the circuit need to be relatively large.

There is a need for an inductive transfer system with a higher tolerance to environmental fluctuations and variations in inductive coil alignment and which transmits at low voltages. The present invention addresses this need.

SUMMARY

Embodiments of the present invention are directed towards providing an inductive power transfer system comprising at least one inductive power outlet comprising at least one primary inductive coil wired to a power supply via a driver; the primary inductive coil for forming an inductive couple with at least one secondary inductive coil wired to an electric load, the secondary inductive coil associated with an inductive power receiver wherein the driver is configured to provide a driving voltage across the primary inductive coil, the driving voltage oscillating at a transmission frequency significantly different from the resonant frequency of the inductive couple. Optionally, the driver comprises a switching unit for intermittently connecting the primary inductive coil to the power supply.

Preferably, the transmission frequency lies within a range in which induced voltage varies approximately linearly with frequency. Optionally, the driver is configured to adjust the transmission frequency in response to the feedback signals.

Optionally, the inductive power outlet comprising a signal detector adapted to detect a first signal and a second signal, and the driver is configured to: increase the transmission frequency when the first signal is detected by the detector, and decrease the transmission frequency when the second signal is detected by the detector. The feedback signals generally carry data pertaining to the operational parameters of the electric load. Operational parameters are selected from the group comprising: required operating voltage for the electric load; required operating current for the electric load; required operating temperature for the electric load; required operating power for the electric load; measured operating voltage for the electric load; measured operating current for the electric load; measured operating temperature for the electric load; measured operating power for the electric load; power delivered to the primary inductive coil; power received by the secondary inductive coil, and a user identification code. Optionally, the detector is selected from the list comprising optical detectors, radio receivers, audio detectors and voltage peak detectors.

Preferably, the driver further comprises a voltage monitor for monitoring the amplitude of a primary voltage across the primary coil. Optionally, the voltage monitor is configured to detect significant increases in primary voltage.

In preferred embodiments, the driving voltage oscillating at a transmission frequency higher than the resonant frequency of the inductive couple, wherein the primary inductive coil is further wired to a reception circuit comprising a voltage monitor for monitoring the amplitude of a primary voltage across the primary coil, and the secondary inductive coil is further wired to a transmission circuit for connecting at least one electric element to the secondary inductive coil thereby increasing the resonant frequency such that a control signal may be transferred from the transmission circuit to the reception circuit. Optionally, the secondary inductive coil is wired to two inputs of a bridge rectifier and the electric load is wired to two outputs of the bridge rectifier wherein the transmission circuit is wired to one input of the bridge rectifier and one output of the bridge rectifier. Typically, the transmission circuit further comprises a modulator for modulating a bit-rate signal with an input signal to create a modulated signal and a switch for intermittently connecting the electrical element to the secondary inductive coil according to the modulated signal. Optionally, the voltage monitor further comprises a correlator for cross-correlating the amplitude of the primary voltage with the bit-rate signal for producing an output signal.

In certain embodiments, the control signal is for transferring a feedback signal from the secondary inductive coil to the primary inductive coil for regulating power transfer across an inductive power coupling. The driver may be configured to adjust the transmission frequency in response to the feedback signals. Typically, the system is adapted to transfer a first signal and a second signal, and the driver is configured to: increase the transmission frequency when the first signal is received by the receiver, and decrease the transmission frequency when the second signal is received by the receiver.

Variously, embodiments of the invention may be incorporated into at least one application selected from a group consisting of: inductive chargers, inductive power adaptors, power tools, kitchen appliances, bathroom players, office equipment, implanted devices, pace tags inductive chargers, inductive power adaptors appliances, computers, media makers, trackers and RFID.

It is a further aim of the current invention to teach a method for regulating power transmission inductive from a primary inductive coil, wired to a power supply via a driver, to a secondary inductive coil, wired to an electric load, the method comprising the following steps: (a)—providing an oscillating voltage to the primary inductive coil at an initial transmission frequency $f_t$ which is substantially different from the resonant frequency $f_R$ of the system; (b)—inducing a secondary voltage in the secondary inductive coil; (c)—monitoring power received by the electric load; (d)—sending a feedback signal when the monitored power deviates from a predetermined range; (e)—the driver receiving the feedback signal; (f)—the driver adjusting the transmission frequency; and (g)—repeating steps (b)-(f).

Optionally, step (d) further comprises: (d1) sending a feedback signal of a first type $S_a$ to the driver, whenever the power drops below a predetermined lower threshold, and (d2) sending a feedback signal of a second type $S_b$ to the driver, whenever the power exceeds a predetermined upper threshold.

According to preferred embodiments the initial transmission frequency $f_t$ is higher than the resonant frequency $f_a$ and step (f) further comprises: (f1) the driver reducing the transmission frequency by an incremental value $-\delta f_1$ when the received feedback signal is of the first type $S_a$, and (f2) the driver increasing the transmission frequency by an incremental value $+\delta f_2$ when the received feedback signal is of the second type $S_b$.

In still other embodiments, the invention is directed to teaching another method for transferring a signal from a secondary inductive coil to a primary inductive coil of an inductive power transfer system, said method comprising the following steps: Step (i)—connecting the primary inductive coil to a voltage monitor for monitoring the amplitude of a primary voltage across the primary coil; Step (ii)—connecting the secondary inductive coil to a transmission circuit for selectively increasing the resonant frequency of the inductive power transfer system; Step (iii)—providing an oscillating voltage to the primary inductive coil at an initial transmission frequency higher than the resonant frequency thereby inducing a voltage in the secondary inductive coil; Step (iv)—using the transmission circuit to modulate a bit-rate signal with the input signal to create a modulated signal and connecting the electrical element to the secondary inductive coil intermittently according to the modulated signal, and Step (v)—using the voltage monitor to cross-correlate the amplitude of the primary voltage with the bit-rate signal for producing an output signal.

BRIEF DESCRIPTION OF THE DRAWINGS

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings.

DETAILED DESCRIPTION

Figure 1:
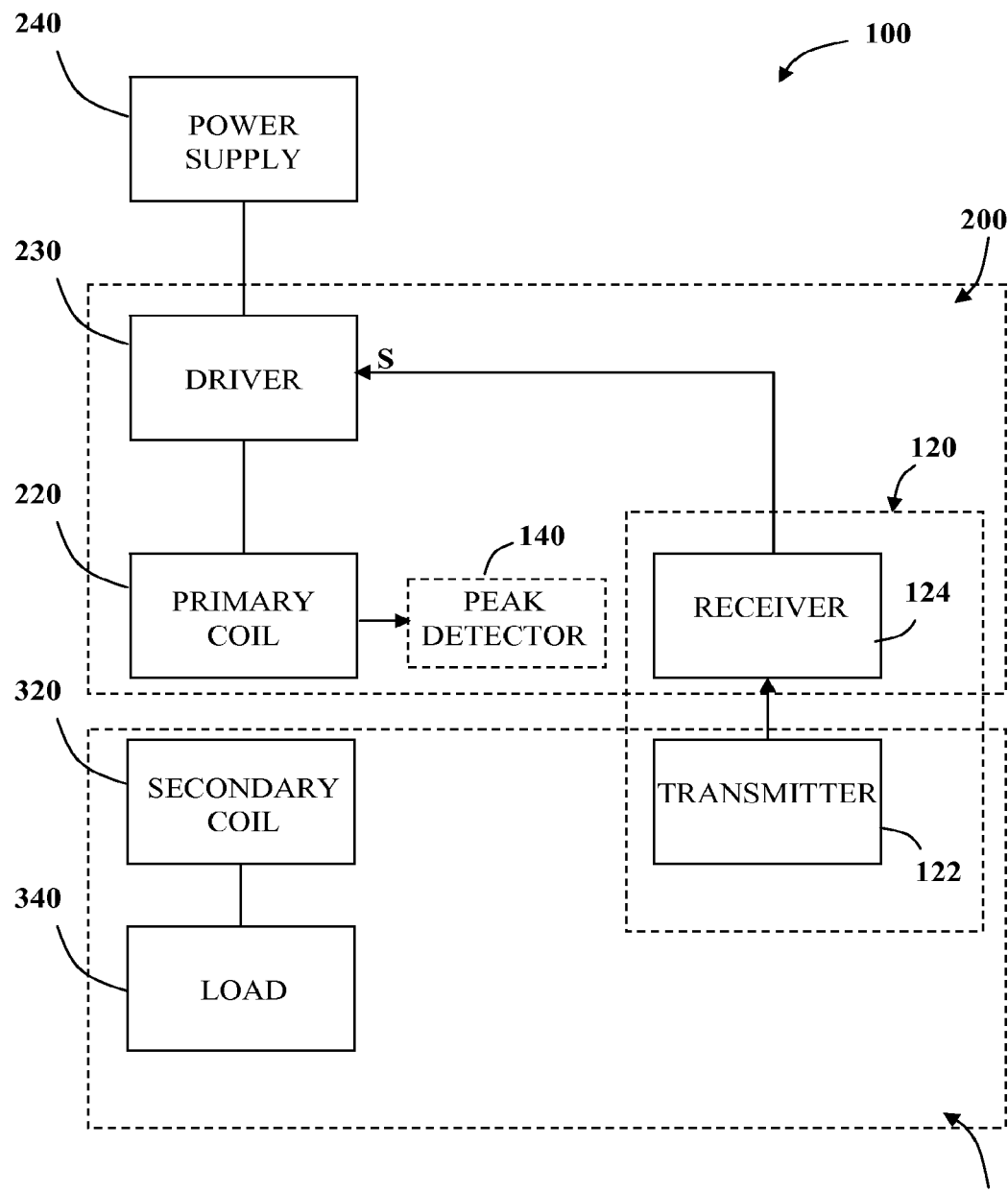
FIG. 1 is a block diagram showing the main elements of an inductive power transfer system with a feedback signal path according to embodiments of the present invention.

Reference is now made to FIG. 1 showing a block diagram of the main elements of an inductive power transfer system 100 adapted to transmit power at a non-resonant frequency according to another embodiment of the invention. The inductive power transfer system 100 consists of an inductive power outlet 200 configured to provide power to a remote secondary unit 300. The inductive power outlet 200 includes a primary inductive coil 220 wired to a power source 240 via a driver 230. The driver 230 is configured to provide an oscillating driving voltage to the primary inductive coil 220.

The secondary unit 300 includes a secondary inductive coil 320, wired to an electric load 340, which is inductively coupled to the primary inductive coil 220. The electric load 340 draws power from the power source 240. A communication channel 120 may be provided between a transmitter 122 associated with the secondary unit 300 and a receiver 124 associated with the inductive power outlet 200. The communication channel 120 may provide feedback signals S and the like to the driver 230.

In some embodiments, a voltage peak detector 140 is provided to detect large increases in the transmission voltage. As will be described below the peak detector 140 may be used to detect irregularities such as the removal of the secondary unit 200, the introduction of power drains, short circuits or the like.

Figure 2:
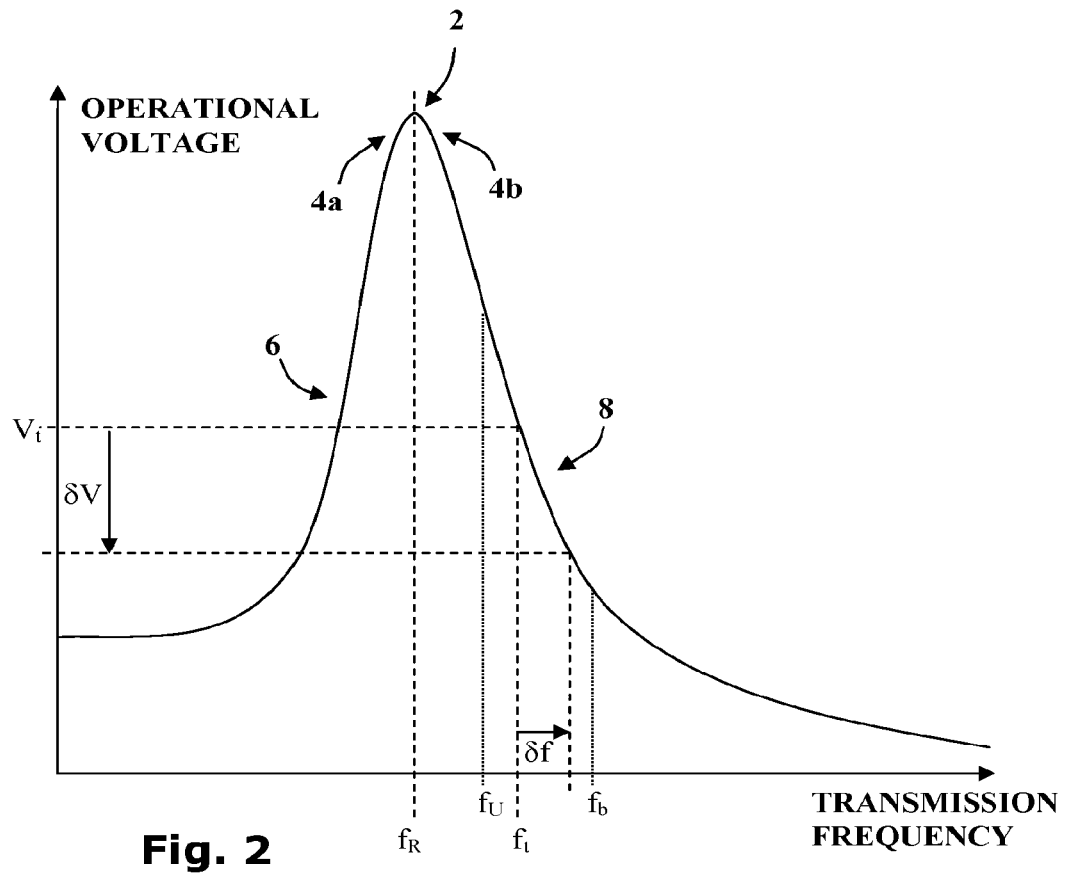
FIG. 2 is a graph showing how the amplitude of operational voltage of an inductive power transfer system varies with transmission frequency.

FIG. 2 is a graph showing how the amplitude of the operational voltage of an inductive power transfer system varies according to the transmission frequency. It is noted that the voltage is at its highest when the transmission frequency is equal to the resonant frequency $f_R$ of the system, this maximum amplitude is known as the resonance peak 2. It is further noted that the slope of the graph is steepest in the regions 4a, 4b to either side of the resonance peak 2. Thus in inductive transfer systems, which operate at or around resonance, a small variation in frequency results in a large change in induced voltage. Similarly, a small change in the resonant frequency of the system results in a large change in the induced voltage. For this reason prior art resonant inductive transfer systems are typically very sensitive to small fluctuations in environmental conditions or variations in alignment between the induction coils.

It is a particular feature of embodiments of the current invention that the driver 230 (FIG. 1) is configured and operable to transmit a driving voltage which oscillates at a transmission frequency which is substantially different from the resonant frequency of the inductive couple. Preferably the transmission frequency is selected to lie within one of the near-linear regions 6, 8 where the slope of the frequency-amplitude graph is less steep.

Figure 3:
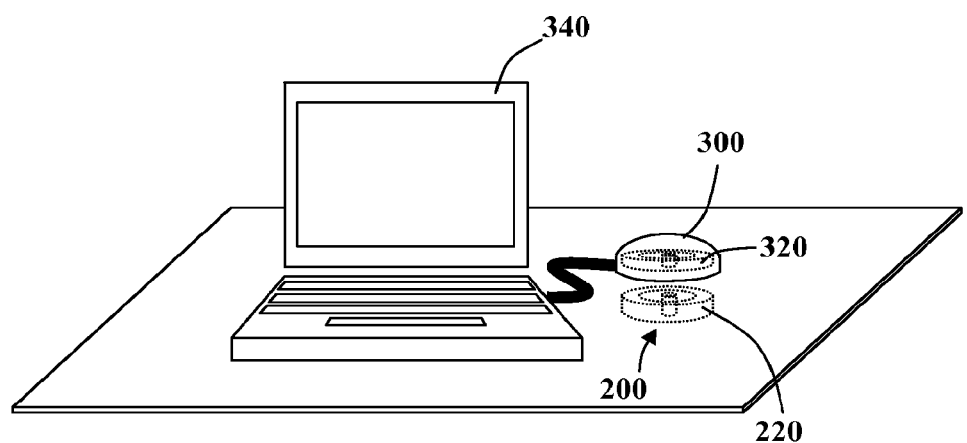
FIG. 3 is a schematic diagram representing a laptop computer drawing power from an inductive power outlet.

One advantage of this embodiment of the present invention may be demonstrated with reference now to FIG. 3. A schematic diagram is shown representing a laptop computer 340 drawing power from an inductive power outlet 200 via a secondary power receiving unit 300. The power receiving unit 300 includes a secondary inductive coil 320 which is aligned to a primary inductive coil 220 in the inductive power outlet 200. Any lateral displacement of the secondary power receiving unit 300 changes the alignment between the secondary inductive coil 320 to the primary inductive coil 220. As a result of the changing alignment, the combined inductance of the coil pair changes which in turn changes the resonant frequency of the system.

If the inductive power outlet 200 transmits power at the resonant frequency of the system, even a small lateral movement would reduce significantly the amplitude of the induced voltage. In contradistinction to the prior art, in embodiments of the present invention the inductive power outlet 200 transmits power at a frequency in one of the regions 6, 8 to either side of the resonance peak 2 (FIG. 2) where the slope of the resonance graph is much shallower. Consequently, the system has a much larger tolerance of variations such as lateral movement.

A further feature of embodiments of inductive power outlets transmitting at frequencies above the natural resonant frequency of the system, is that if the resonant frequency of the system increases for some reasons, then the transmission voltage increases sharply. In preferred embodiments, a peak detector 140 (FIG. 1) is be provided to monitor the transmission voltage of the power outlet 200 and is configured to detect large increases in the transmission voltage indicating an increase in resonant frequency.

Referring again to the resonant formula for inductive systems, $$f_R = \frac{1}{2\pi\sqrt{LC}},$$

it is noted that any decrease in either the inductance L or the capacitance C of the system increases the resonant frequency and may be detected by the peak detector 140.

As an example of the use of a peak detector 140, reference is again made to FIG. 3. It will be appreciated that in a desktop environment, conductive bodies such as a paper clip, metal rule, the metal casing a stapler, a hole-punch or any metallic objects may be introduced between the inductive power outlet 200 and the secondary power receiving unit 300. The oscillating magnetic field produced by the primary coil 220 would then produce eddy currents in the conductive body heating it and thereby draining power from the primary coil 220. Such a power drain may be wasteful and/or dangerous. Power drains such as described above generally reduce the inductance L of the system thereby increasing its resonant frequency.

The inductance L of the system may also be reduced by the removal of the secondary coil 220, the creation of a short circuit or the like. A peak detector 140, wired to the inductive power outlet, may detect any of these scenarios as a large increase in transmission voltage. Where required, the power transfer system may be further configured to shut down, issue a warning or otherwise protect the user and the system in the event that the peak detector 140 detects such an increase in transmission voltage.

Figure 4:
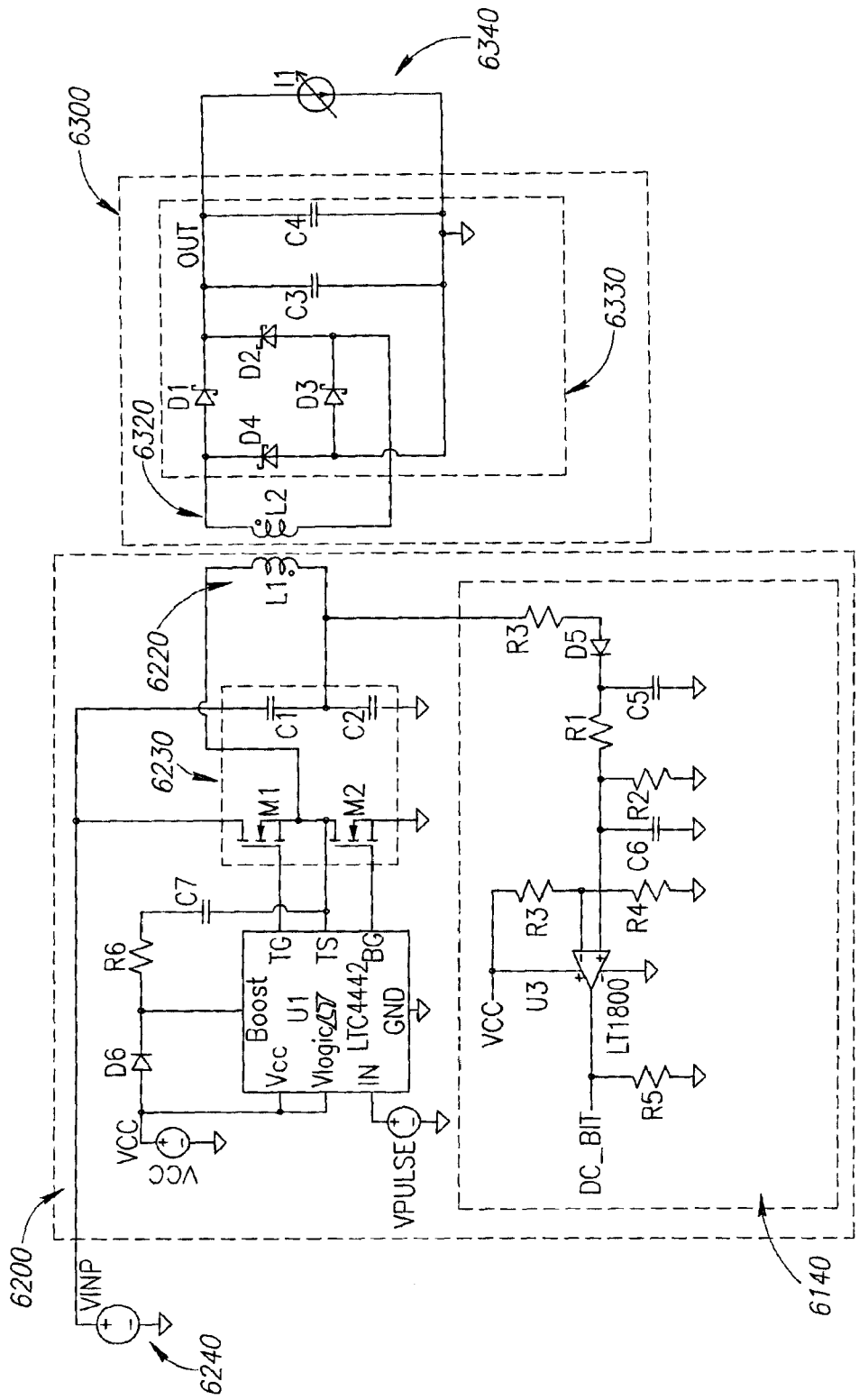
FIG. 4 is a circuit diagram of an inductive power transfer system according to another embodiment of the invention including a peak detector for detecting large increases in transmission voltage.

FIG. 4 is a circuit diagram of an inductive power outlet 6200 and secondary unit 6300. The secondary unit 6300 comprises a secondary coil 6320 wired to an electric load 6340 via a rectifier 6330.

The inductive power outlet 6200 comprises a primary coil 6220 driven by a half-bridge converter 6230 connected to a power source 6240. The half-bridge converter 6230 is configured to drive the primary coil 6220 at a frequency higher than the resonant frequency of the system and a peak detector 6140 is configured to detect increases in the transmission voltage.

Although only a half-bridge converter is represented in FIG. 4, it is noted that other possible driving circuits include: a DC-to-DC converter, an AC-to-DC converter, an AC-to-AC converter, a flyback transformer, a full-bridge converter, a flyback converter or a forward converter for example.

Another advantage of non-resonant transmission is that the transmission frequency may be used to regulate power transfer. Prior art inductive power transfer systems, typically regulate power transfer by altering the duty cycle of the transmission voltage. Unlike prior art systems, because embodiments of the present invention transmit at a frequency not equal to the resonant frequency of the system, the driver 230 may be configured to regulate power transfer by adjusting the transmission frequency.

The regulation is illustrated with reference to FIG. 2. In embodiments of the invention, the frequency of transmission may be selected to be in the approximately linear region 8 of the curve between a lower frequency value of $f_L$ and an upper frequency value of $f_u$. A transmission frequency $f_t$, higher than the resonant frequency $f_a$ of the system, produces an induced voltage of $V_t$. The induced voltage can be increased by reducing the transmission frequency so that it is closer to the resonant frequency $f_a$. Conversely, the induced voltage may be reduced by increasing the transmission frequency so that it is further from the resonant frequency $f_a$. For example, an adjustment of transmission frequency by $\delta f$ produces a change in induced voltage of $\delta V$.

In some embodiments, a communication channel 120 (FIG. 1) is provided between the secondary unit 300 and the inductive power outlet 200 to communicate the required operating parameters. In embodiments of the invention operating parameters the communication channel 120 may be used to indicate the transmission frequency required by the electric load 340 to the driver 230.

The communication channel 120 may further provide a feedback signal during power transmission. The feedback transmission may communicate required or monitored operating parameters of the electric load 240 such as: required operating voltage, current, temperature or power for the electric load 240; the measured voltage, current, temperature or power supplied to the electric load 240 during operation; the measured voltage, current, temperature or power received by the electric load 240 during operation and the like.

In some embodiments, a microcontroller in the driver 230 may use such feedback parameters to calculate the required transmission frequency and to adjust the driver accordingly. Alternatively, simple feedback signals may be provided indicating whether more or less power is required.

Figure 5:
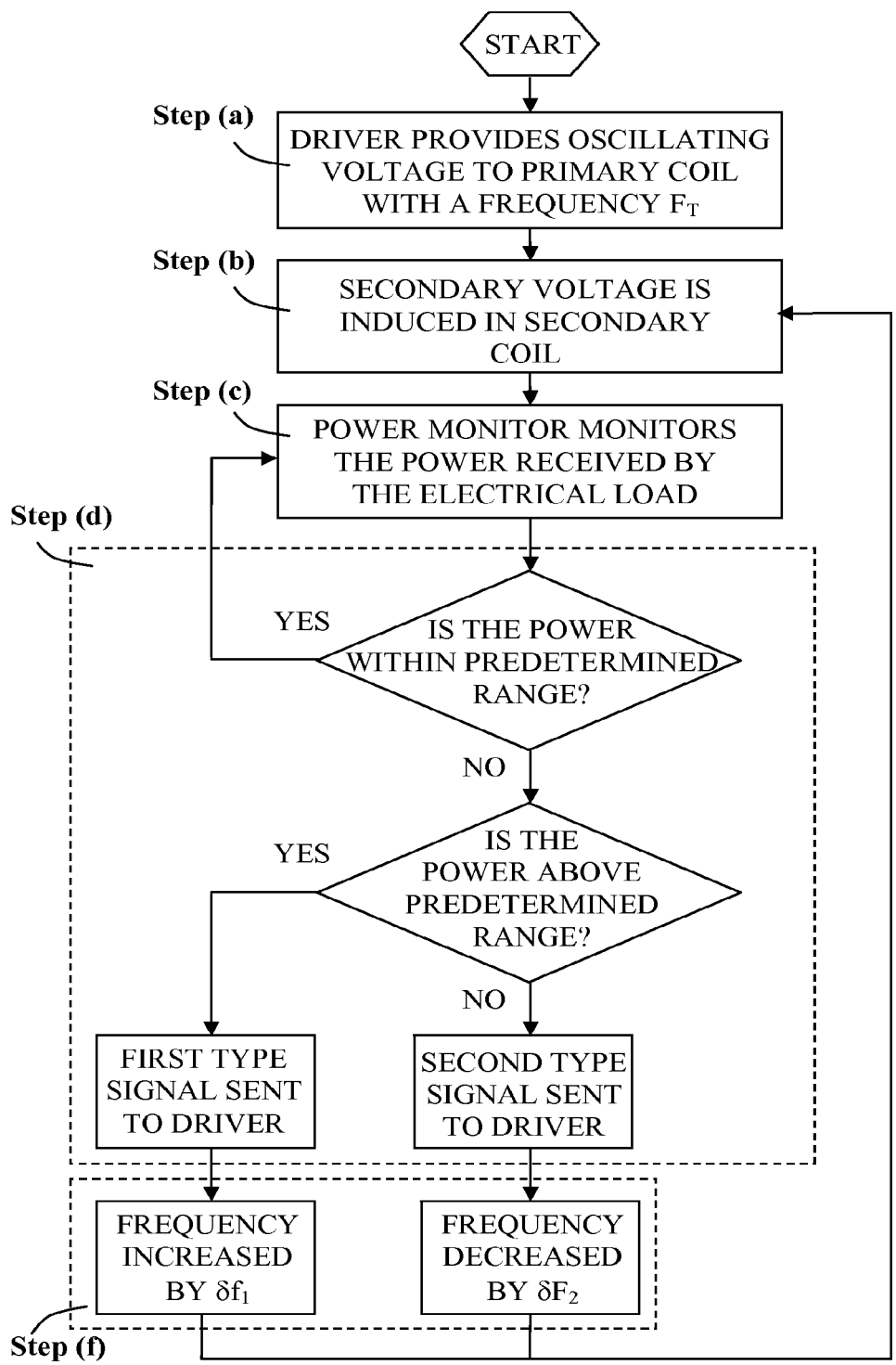
FIG. 5 is a flowchart showing a method for regulating power transfer by varying the power transmission frequency in an inductive power transfer system according to a further embodiment of the invention.

One example of a power regulation method using simple feedback signals is shown in the flowchart of FIG. 5. The method involves the following steps: Step (a)—The driver 230 provides an oscillating voltage at a transmission frequency $f_t$ which is higher than the resonant frequency $f_a$ of the system. Step (b)—A secondary voltage is induced in the secondary coil 320. Step (c)—A power monitor in the secondary unit 300, monitors the power received by the electric load 340. Step (d)—If the power received by the electric load 340 lies within a predetermined range then no action is taken. If the power received by the electric load 340 is below the predetermined range, then a feedback signal of a first type $S_a$ is sent to the driver. If the power received by the electric load 340 is above the predetermined range, then a feedback signal of a second type $S_b$ is sent to the driver. Step (e)—A feedback signal is received by the driver 230. Step (f)—If the received feedback signal is of the first type $S_a$, then the transmission frequency is increased by an incremental value $+\delta f_1$. If the received feedback signal is of the second type $S_b$, then the transmission frequency is decreased by an incremental value $-\delta f_2$.

It is noted that by using the power regulation method described above, when the power received by the load is too high, a series of feedback signals of the first type $S_a$ will be transmitted until the power is reduced into the acceptable range. Likewise when the power received by the load is too low, a series of feedback signals of the second type $S_b$ will be transmitted until the power is increased into the acceptable range. It is noted that the positive incremental value $\delta f_1$ may be greater than, less than or equal to the negative incremental value $\delta f_2$.

Alternatively, other power regulation methods using frequency adjustment may be used. For example, the operating parameters of the electric load may be monitored and their values may be transmitted to the power outlet via the communications channel 120. A processor in the power outlet may then calculate the required transmission frequency directly.

The method described hereabove, refers to a non-resonant transmission frequency lying within the linear region 8 (FIG. 2), higher than the resonant peak 2. It will be appreciated however that in alternative embodiments frequency-controlled power regulation may be achieved when the transmission frequency lies in the lower linear region of the resonance curve. Nevertheless, for certain embodiments, the selection of transmission frequencies in the higher linear region 8 may be preferred, particularly where peak detection, as described above, is required.

Referring back to FIG. 1, various transmitters 122 and receivers 124 may be used for the communication channel 120. Where, as is often the case for inductive systems, the primary and secondary coils 220, 320 are galvanically isolated, optocouplers, for example, may be used. A light emitting diode serves as a transmitter and sends encoded optical signals over short distances to a photo-transistor which serves as a receiver. However, optocouplers typically need to be aligned such that there is a line-of-sight between transmitter and receiver. In systems where alignment between the transmitter and receiver may be difficult to achieve, optocoupling may be inappropriate and alternative systems may be preferred such as ultrasonic signals transmitted by piezoelectric elements or radio signals such as Bluetooth, WiFi and the like. Alternatively, the primary and secondary coils 220, 320 may themselves serve as the transmitter 122 and receiver 124.

In certain embodiments, an optical transmitter, such as a light emitting diode (LED) for example, is incorporated within the secondary unit 300 and is configured and operable to transmit electromagnetic radiation of a type and intensity capable of penetrating the casings of both the secondary unit 300, and the power outlet 200. An optical receiver, such as a photodiode, a phototransistor, a light dependent resistors of the like, is incorporated within the power outlet 200 for receiving the electromagnetic radiation.

Figure 6:
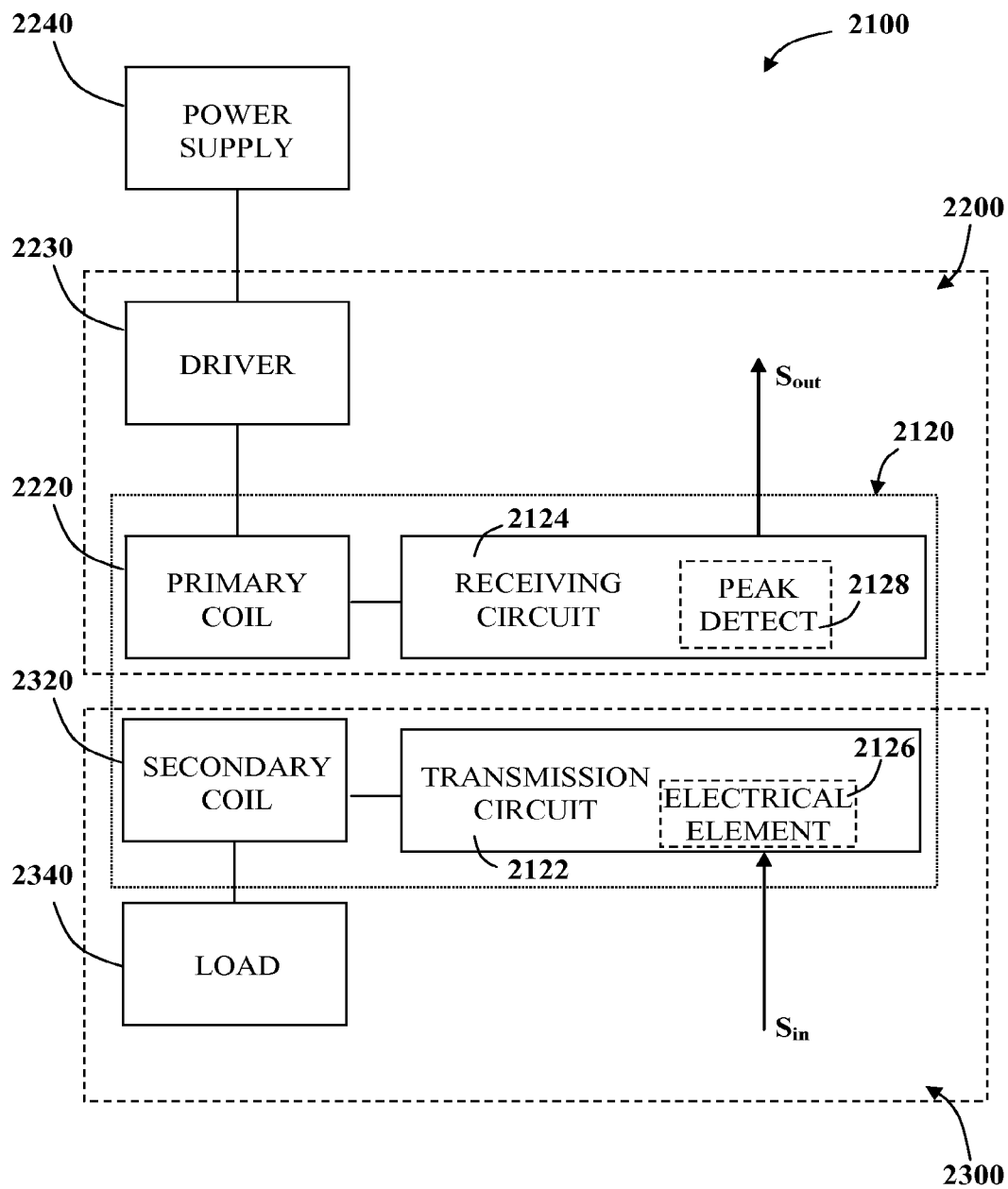
FIG. 6 is a block diagram showing the main elements of an inductive power transfer system with an inductive feedback channel according to still another embodiment of the present invention.

With reference to the block diagram of FIG. 6, it is a particular feature of certain embodiments of the invention that an inductive communications channel 2120 is incorporated into the inductive power transfer system 2100 for transferring signals between a inductive power outlet 2200 and a remote secondary unit 2300. The communication channel 2120 is configured to produce an output signal $S_{out}$ in the power outlet 2200 when an input signal $S_{in}$ is provided by the secondary unit 2300 without interrupting the inductive power transfer from the outlet 2200 to the secondary unit 2300.

The inductive power outlet 2200 includes a primary inductive coil 2220 wired to a power source 2240 via a driver 2230. The driver 2230 is configured to provide an oscillating driving voltage to the primary inductive coil 2220, typically at a voltage transmission frequency $f_t$ which is higher than the resonant frequency $f_a$ of the system.

The secondary unit 2300 includes a secondary inductive coil 2320, wired to an electric load 2340, which is inductively coupled to the primary inductive coil 2220. The electric load 2340 draws power from the power source 2240. Where the electric load 2340 requires a direct current supply, for example a charging device for an electrochemical cell or the like, a rectifier 2330 may be provided to rectify the alternating current signal induced in the secondary coil 2320.

An inductive communication channel 2120 is provided for transferring signals from the secondary inductive coil 2320 to the primary inductive coil 2220 concurrently with uninterrupted inductive power transfer from the primary inductive coil 2220 to the secondary inductive coil 2320. The communication channel 2120 may provide feedback signals to the driver 2230.

The inductive communication channel 2120 includes a transmission circuit 2122 and a receiving circuit 2124. The transmission circuit 2122 is wired to the secondary coil 14 2320, optionally via a rectifier 2330, and the receiving circuit 2124 is wired to the primary coil 2220.

The signal transmission circuit 2122 includes at least one electrical element 2126, selected such that when it is connected to the secondary coil 2320, the resonant frequency $f_R$ of the system increases. The transmission circuit 2122 is configured to selectively connect the electrical element 2126 to the secondary coil 2320. As noted above, any decrease in either the inductance L or the capacitance C increases the resonant frequency of the system. Optionally, the electrical element 2126 may have a low resistance for example, with a resistance of under 50 ohms and preferably about 1 ohm.

Typically, the signal receiving circuit 2124 includes a voltage peak detector 2128 configured to detect large increases in the transmission voltage. In systems where the voltage transmission frequency $f_t$ is higher than the resonant frequency $f_a$ of the system, such large increases in transmission voltage may be caused by an increase in the resonant frequency $f_a$ thereby indicating that the electrical element 2126 has been connected to the secondary coil 2320. Thus the transmission circuit 2122 may be used to send a signal pulse to the receiving circuit 2124 and a coded signal may be constructed from such pulses.

According to some embodiments, the transmission circuit 2122 may also include a modulator (not shown) for modulating a bit-rate signal with the input signal $S_{in}$. The electrical element 2126 may then be connected to the secondary inductive coil 2320 according to the modulated signal. The receiving circuit 2124 may include a demodulator (not shown) for demodulating the modulated signal. For example, the voltage peak detector 2128 may be connected to a correlator for cross-correlating the amplitude of the primary voltage with the bit-rate signal thereby producing the output signal $S_{out}$.

In other embodiments, a plurality of electrical elements 2126 may be provided which may be selectively connected to induce a plurality of voltage peaks of varying sizes in the amplitude of the primary voltage. The size of the voltage peak detected by the peak detector 2128 may be used to transfer multiple signals.

Figure 7:
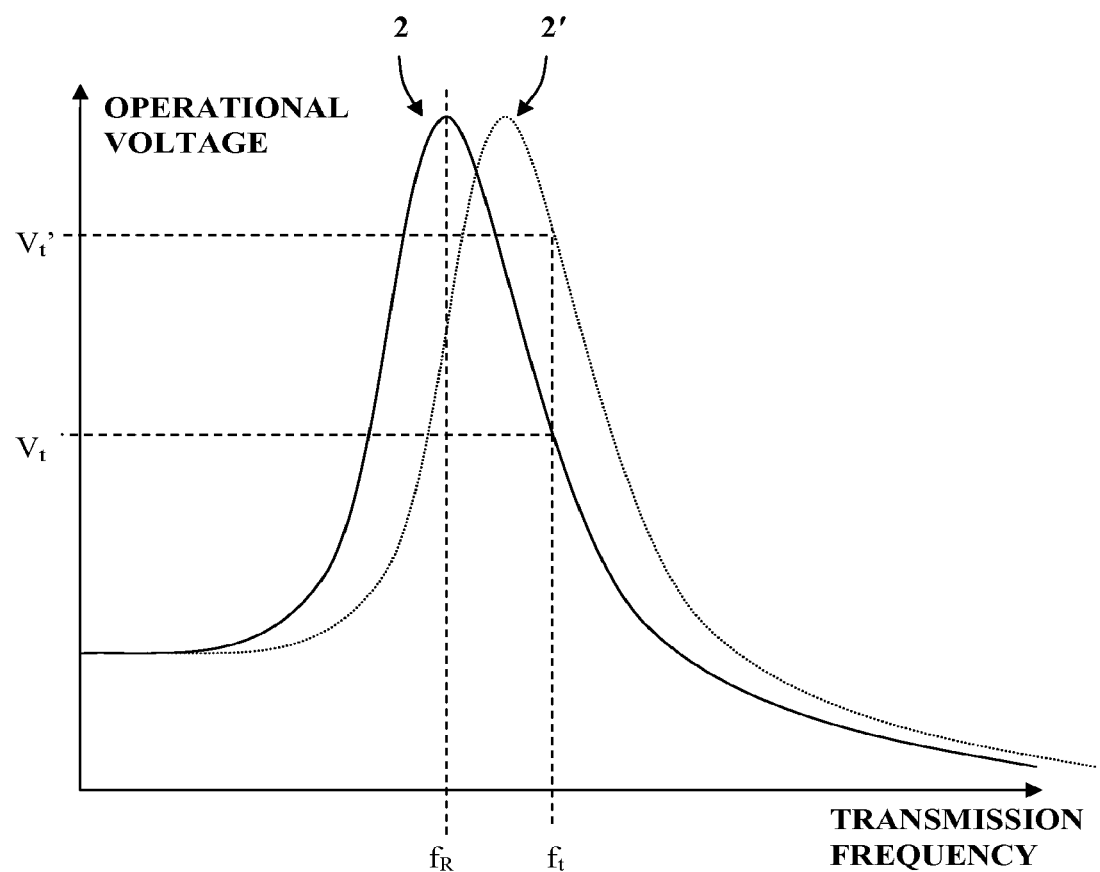
FIG. 7 is a graph showing how the variation of operational voltage with transmission frequency is effected by changes in resonant frequency of the system.

FIG. 7 is a graph showing how the amplitude of the operational voltage varies according to the transmission frequency. It is noted that the voltage is at its highest when the transmission frequency is equal to the resonant frequency $f_R$ of the system, this maximum amplitude is known as the resonance peak 2. If the resonant frequency $f_R$ of the system increases, a new resonance peak 2' is produced.

According to another embodiment of the invention, an inductive power transfer system 2100 operates at a given transmission frequency $f_t$ which is higher than the resonant frequency $f_R$ of the system. The normal operating voltage $V_t$ is monitored by the voltage peak detector 2128. When the electric element 2126 is connected to the secondary inductive coil 2320 the resonant frequency of the system increases. Therefore, the operating voltage increases to a higher value $V_t'$. This increase is detected by the voltage peak detector 2128.

It is noted that in contradistinction to prior art inductive signal transfer systems such as described in U.S. Pat. No. 5,455,466 to Terry J. Parks and David S. Register, the present invention enables data signals to be transferred from the secondary coil 2320 to the primary coil 2220 concurrently with inductive transfer of power from the primary coil 2220 to the secondary coil 2320. Consequently, the signal transfer system may be used to provide feedback signals for real time power regulation.

Figure 8:
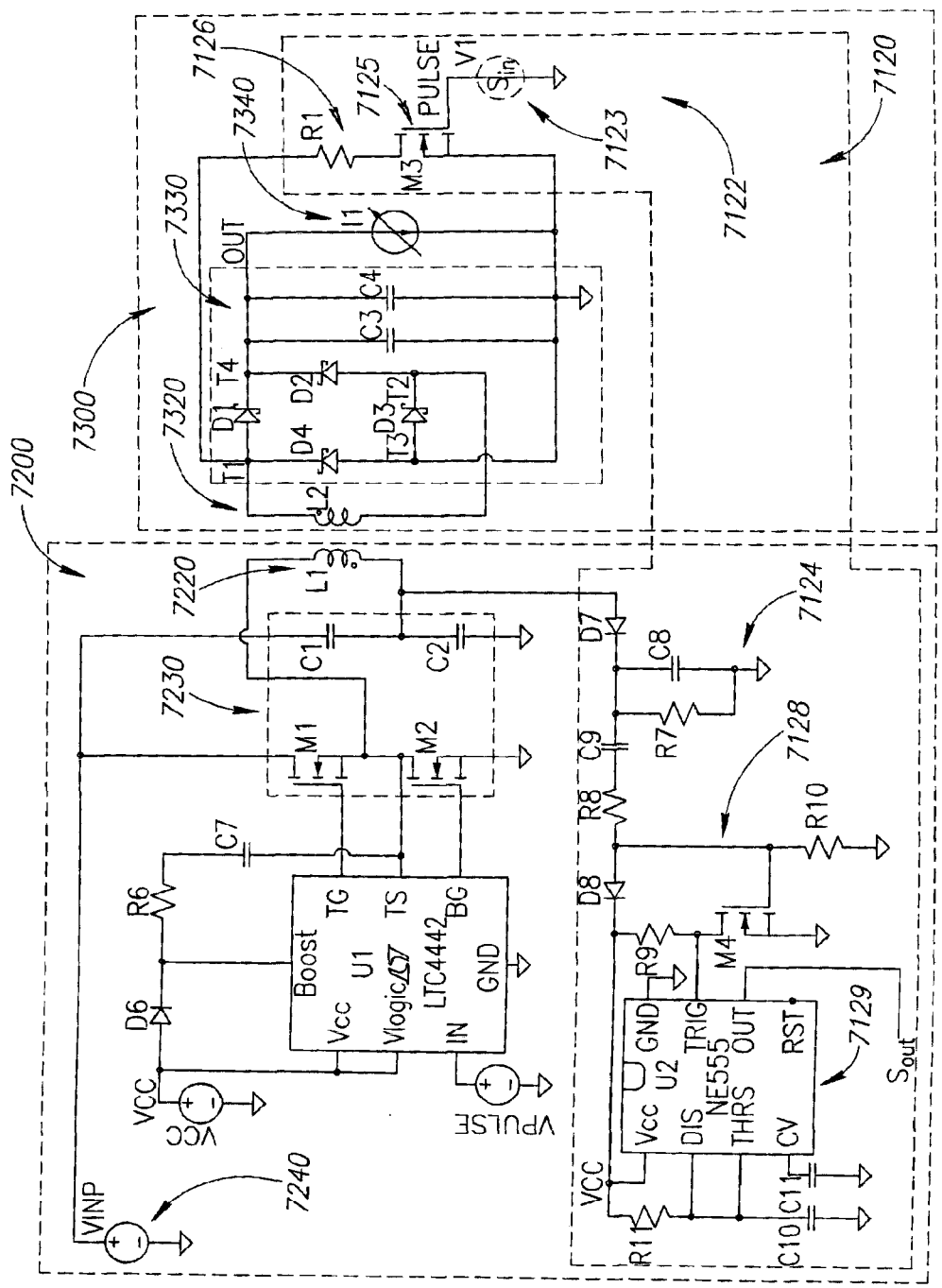
FIG. 8 is a circuit diagram of an inductive power transfer system including an inductive feedback channel for providing coil-to-coil signal transfer concurrently with uninterrupted inductive power transfer between the coils in accordance with yet another embodiment of the invention.

FIG. 8 shows an exemplary circuit diagram of an inductive power outlet 7200 and a secondary unit 7300, according to another embodiment of the invention. An inductive feedback channel 7120 is provided for transferring signals between the coils concurrently with uninterrupted inductive power transfer.

The inductive power outlet 7200 comprises a primary coil 7220 driven by a half-bridge converter 7230 connected to a power source 7240. The half-bridge converter 7230 is configured to drive the primary coil 7220 at a frequency higher than the resonant frequency of the system. The secondary unit 7300 comprises a secondary coil 7320 wired to the input terminals $T_1$, $T_2$ of a rectifier 7330, and an electric load 7340 wired to the output terminals $T_3$, $T_4$ of the rectifier 7330.

The inductive feedback channel 7120 comprises a transmission circuit 7122, in the secondary unit 7300 and a receiving circuit 7124 in the inductive power outlet 7200. The transmission circuit 7122 comprises an electrical resistor 7126 connected to the rectifier 7330 via a power MOSFET switch 7125. A modulator 7123 may provide an input signal $S_{in}$ to the power MOSFET 7125.

It is noted that in this embodiment the transmission circuit 7122 is wired to one input terminal $T_1$ and one output terminal $T_3$ of the rectifier 7330. This configuration is particularly advantageous as, even when the transmission circuit 7122 is connected, the resistor 7126 only draws power from the system during one half of the AC cycle, thereby significantly reducing power loss.

The receiving circuit 7124 includes a voltage peak detector 7128 that is configured to detect increases in the transmission voltage, and a demodulator 7129 for producing an output signal $S_{out}$.

Figure 9:
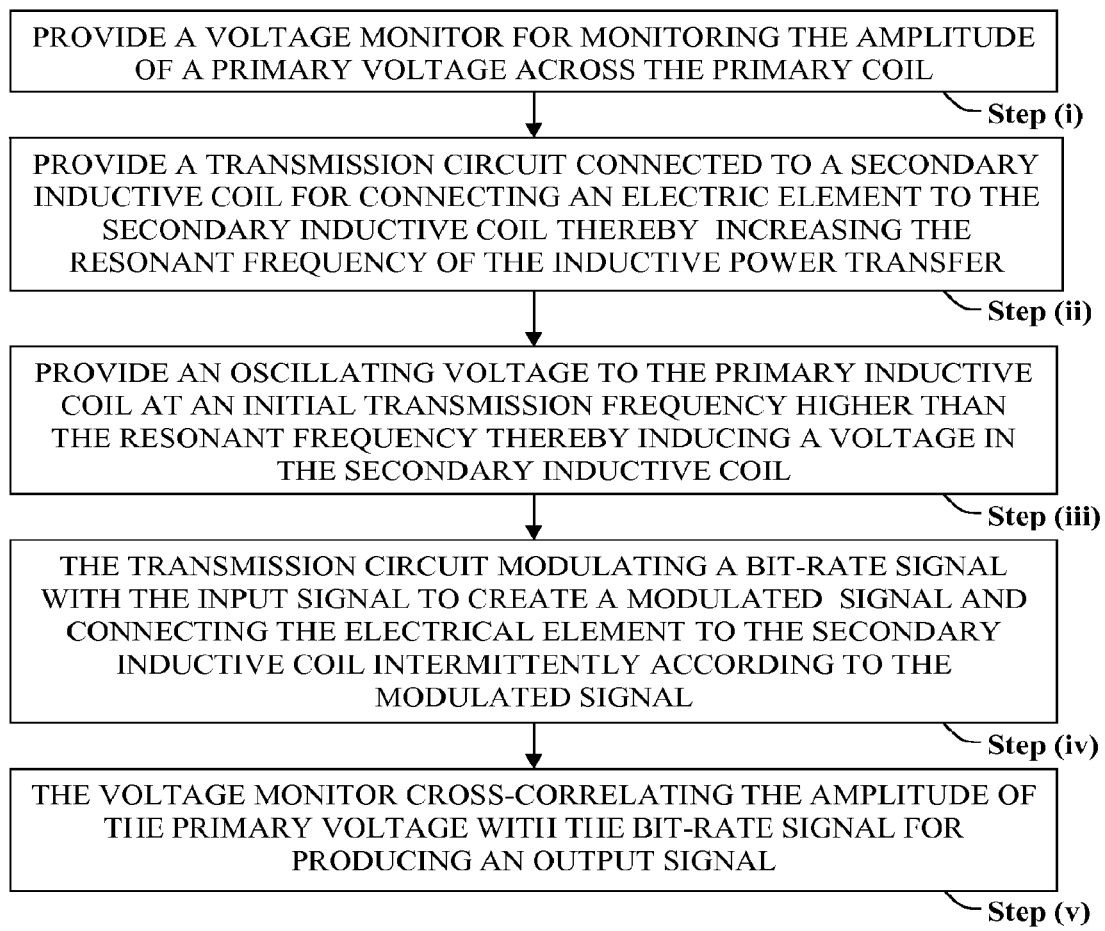
FIG. 9 is a flowchart showing a method for inductively transferring a signal from the secondary inductive coil to a primary inductive coil of an inductive power transfer system according to still a further embodiment of the invention.

With reference now to FIG. 9, a flowchart is presented showing the main steps in a method for transferring a signal from the secondary inductive coil to a primary inductive coil of an inductive power transfer system. The method includes the following steps:

Step (i)—connecting the primary inductive coil to a voltage monitor for monitoring the amplitude of a primary voltage across the primary coil;

Step (ii)—connecting the secondary inductive coil to a transmission circuit for selectively increasing the resonant frequency of the inductive power transfer system;

Step (iii)—providing an oscillating voltage to the primary inductive coil at an initial transmission frequency higher than the resonant frequency thereby inducing a voltage in the secondary inductive coil;

Step (iv)—using the transmission circuit to modulate a bit-rate signal with the input signal to create a modulated signal and connecting the electrical element to the secondary inductive coil intermittently according to the modulated signal, and Step (v)—using the voltage monitor to cross-correlate the amplitude of the primary voltage with the bit-rate signal for producing an output signal.

Therefore, the inductive communication channel 2120 may be used to transfer a feedback signal from the secondary inductive coil to the primary inductive coil for regulating power transfer across an inductive power coupling as described above.

It will be appreciated that embodiments of the present invention may be useful in a wide range of applications. Inductive power receivers may be used to wirelessly provide power for a variety of electrical devices. Embodiments of the present invention may be integrated into such inductive power receivers. In particular, because non-resonant transmission uses lower transmission voltages, heat loss from the non-resonant system is lower. Thus, embodiments of the current invention may be of particular use when incorporated within high power applications such as power tools, kitchen appliances, bathroom appliances, computers, media players, office equipment and the like.

The reduced heat loss, associated with embodiments of the non-resonant systems of the invention, is particularly useful when heat dissipation is difficult for example when the power receiver has small dimensions or for heat-sensitive equipment such as measuring devices. Also, it is desirable that devices implanted into a living body do not dissipate large amounts of heat into the body. Therefore, non-resonant inductive transfer is well suited to implanted devices, such as pace makers, trackers, and the like.

It is also noted that in recent years public concern about the threat of a global energy crisis has resulted in a greater emphasis being placed upon optimizing the efficiency of energy transfer. It is difficult to achieve more demanding specifications using existing technology and, in this context, embodiments of the present invention may be used to provide high powers with very low energy losses. Consequently the current invention is an important element in the drive for greater efficiency.

Furthermore embodiments of the present invention may be advantageously utilized in inductive power transfer systems in any of the various applications in which power is transferred from a primary coil to a remote secondary coil. Among others, such applications include: inductive chargers for use in charging electronic devices; inductive power adaptors for powering electronic devices such as computers, televisions, kitchen appliances, office equipment and the like; medical applications in which power is transferred remotely to devices implanted in a patient; communications with remote RFID tags; military applications in which power is transferred across thick armored plating; communication or inductive energy transfer to secondary inductive coils buried underground; communication or inductive energy transfer to secondary inductive coils submerged under water, for example in submarine applications; and communication or inductive energy with secondary coils which are moving relative to the primary coil.

Thus, by using a transmission voltage oscillating at a frequency different from the resonant frequency of the system, the inductive transfer system has a higher tolerance to environmental fluctuations and variations in inductive coil alignment than other transfer systems and the frequency may be used to regulate power transfer. Moreover, when the transmission frequency is higher than the resonant frequency of the system, a peak detector may be used to indicate hazards and provide an inductive communication channel.

The scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components. As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An inductive power transfer system comprising at least one inductive power outlet comprising at least one primary inductive coil wired to a power supply via a driver; said primary inductive coil for forming an inductive couple having a characteristic resonant frequency with at least one secondary inductive coil wired to an electric load, said secondary inductive coil associated with an inductive power receiver wherein said driver is configured to provide a driving voltage across said primary inductive coil, said driving voltage oscillating at a transmission frequency significantly different from said characteristic resonant frequency of said inductive couple, said driving voltage oscillating at a transmission frequency higher than the resonant frequency of said inductive couple, wherein said primary inductive coil is further wired to a reception circuit comprising a voltage monitor for monitoring the amplitude of a primary voltage across said primary coil, and said secondary inductive coil is further wired to a transmission circuit for connecting at least one electric element to said secondary inductive coil thereby decreasing capacitance of the system;

such that a control signal may be transferred from said transmission circuit to said reception circuit.

2. The system of claim 1 wherein said driver comprises a switching unit for intermittently connecting said primary inductive coil to said power supply.

3. The system of claim 1 wherein said transmission frequency lies within a range in which induced voltage varies approximately linearly with frequency.

4. The system of claim 1, said control signal for transferring a feedback signal from said secondary inductive coil to said primary inductive coil for regulating power transfer across an inductive power coupling.

5. The system of claim 4 said driver being configured to adjust said transmission frequency in response to said feedback signals.

6. The system of claim 4 adapted to transfer a first signal and a second signal, and said driver being configured to:
increase said transmission frequency when said first signal is received by the receiver, and
decrease said transmission frequency when said second signal is received by the receiver.

7. The system of claim 4 wherein said feedback signal carries data pertaining to the operational parameters of said electric load.

8. The system of claim 7 wherein said operational parameters are selected from the group consisting of:
required operating voltage for said electric load;
required operating current for said electric load;
required operating temperature for said electric load;
required operating power for said electric load;
measured operating voltage for said electric load;
measured operating current for said electric load;
measured operating temperature for said electric load;
measured operating power for said electric load;
power delivered to said primary inductive coil;
power received by said secondary inductive coil, and
a user identification code.

9. The system of claim 1 wherein said voltage monitor is configured to detect significant increases in primary voltage.

10. The system of claim 1 comprising a power converter selected from the group comprising: a transformer, a DC-to-DC converter, an AC-to-DC converter, an AC-to-AC converter, a flyback transformer, a flyback converter, a full-bridge converter, a half-bridge converter and a forward converter.

11. The system of claim 1, said secondary inductive coil being wired to two inputs of a bridge rectifier and said electric load being wired to two outputs of said bridge rectifier wherein said transmission circuit is wired to one input of said bridge rectifier and one output of said bridge rectifier.

12. The system of claim 1 wherein said transmission circuit further comprises a modulator for modulating a bit-rate signal with an input signal to create a modulated signal and a switch for intermittently connecting said electrical element to said secondary inductive coil according to said modulated signal.

13. The system of claim 1 wherein said voltage monitor further comprises a correlator for cross-correlating the amplitude of said primary voltage with said bit-rate signal for producing an output signal.

14. The system of claim 1 incorporated into at least one application selected from a group consisting of: inductive chargers, inductive power adaptors, power tools, kitchen appliances, bathroom appliances, computers, media players, office equipment, implanted devices, pace makers, trackers and RFID tags.

15. An inductive power transfer system comprising at least one inductive power outlet comprising at least one primary inductive coil wired to a power supply via a driver; said primary inductive coil for forming an inductive couple having a characteristic resonant frequency with at least one secondary inductive coil wired to an electric load, said secondary inductive coil associated with an inductive power receiver wherein said driver is configured to provide a driving voltage across said primary inductive coil, said driving voltage oscillating at a transmission frequency significantly different from said characteristic resonant frequency of said inductive couple, said driving voltage oscillating at a transmission frequency higher than the resonant frequency of said inductive couple, wherein
said primary inductive coil is further wired to a reception circuit comprising a voltage monitor for monitoring the amplitude of a primary voltage across said primary coil, and
said secondary inductive coil is further wired to a transmission circuit for connecting at least one electric element to said secondary inductive coil thereby decreasing inductance of the system;
such that a control signal may be transferred from said transmission circuit to said reception circuit.

16. The system of claim 15, said secondary inductive coil being wired to two inputs of a bridge rectifier and said electric load being wired to two outputs of said bridge rectifier wherein said transmission circuit is wired to one input of said bridge rectifier and one output of said bridge rectifier.

17. The system of claim 15 wherein said transmission circuit further comprises a modulator for modulating a bit-rate signal with an input signal to create a modulated signal and a switch for intermittently connecting said electrical element to said secondary inductive coil according to said modulated signal.

18. The system of claim 15 wherein said voltage monitor further comprises a correlator for cross-correlating the amplitude of said primary voltage with said bit-rate signal for producing an output signal.

19. The system of claim 15, said control signal for transferring a feedback signal from said secondary inductive coil to said primary inductive coil for regulating power transfer across an inductive power coupling.

20. The system of claim 19 said driver being configured to adjust said transmission frequency in response to said feedback signals.

21. The system of claim 19 adapted to transfer a first signal and a second signal, and said driver being configured to:
increase said transmission frequency when said first signal is received by the receiver, and decrease said transmission frequency when said second signal is received by the receiver.

22. The system of claim 19 wherein said feedback signal carries data pertaining to the operational parameters of said electric load.

23. The system of claim 22 wherein said operational parameters are selected from the group consisting of:
required operating voltage for said electric load;
required operating current for said electric load;
required operating temperature for said electric load;
required operating power for said electric load;
measured operating voltage for said electric load;
measured operating current for said electric load;
measured operating temperature for said electric load;

measured operating power for said electric load;
power delivered to said primary inductive coil;
power received by said secondary inductive coil, and
a user identification code.

24. The system of claim 15 wherein said driver comprises a switching unit for intermittently connecting said primary inductive coil to said power supply.

25. The system of claim 15 wherein said transmission frequency lies within a range in which induced voltage varies approximately linearly with frequency.

26. The system of claim 15 wherein said voltage monitor is configured to detect significant increases in primary voltage.

27. The system of claim 15 comprising a power converter selected from the group comprising: a transformer, a DC-to-DC converter, an AC-to-DC converter, an AC-to-AC converter, a flyback transformer, a flyback converter, a full-bridge converter, a half-bridge converter and a forward converter.

28. The system of claim 15 incorporated into at least one application selected from a group consisting of: inductive chargers, inductive power adaptors, power tools, kitchen appliances, bathroom appliances, computers, media players, office equipment, implanted devices, pace makers, trackers and RFID tags.

29. An electronic device comprising the inductive power receiver of the system of claim 1.

30. An electronic device comprising the inductive power receiver of the system of claim 15.

\* \* \* \* \*